US008723958B2

(12) United States Patent
Kamon et al.

(10) Patent No.: US 8,723,958 B2
(45) Date of Patent: May 13, 2014

(54) IMAGE PICKUP APPARATUS AND IMAGE PICKUP ELEMENT

(75) Inventors: Koichi Kamon, Otokuni-gun (JP); Jun Takayama, Tama (JP)

(73) Assignee: Konica Minolta Opto, Inc., Tokyo (JP)

(*) Notice: Subject to any disclaimer, the term of this patent is extended or adjusted under 35 U.S.C. 154(b) by 408 days.

(21) Appl. No.: 12/989,840

(22) PCT Filed: Apr. 30, 2009

(86) PCT No.: PCT/JP2009/058495
§ 371 (c)(1),
(2), (4) Date: Oct. 27, 2010

(87) PCT Pub. No.: WO2009/133931
PCT Pub. Date: Nov. 5, 2009

(65) Prior Publication Data
US 2011/0063451 A1    Mar. 17, 2011

(30) Foreign Application Priority Data

Apr. 30, 2008    (JP) .................................. 2008-118773
Sep. 4, 2008    (JP) .................................. 2008-227493

(51) Int. Cl.
*H04N 5/33*    (2006.01)
*H04N 5/228*    (2006.01)

(52) U.S. Cl.
USPC ...................................... 348/164; 348/222.1

(58) Field of Classification Search
USPC .......................................................... 348/164
See application file for complete search history.

(56) References Cited

U.S. PATENT DOCUMENTS

2006/0023943 A1* 2/2006 Makino .......................... 382/167
2006/0171605 A1* 8/2006 Watanabe ..................... 382/274
2007/0146512 A1    6/2007 Suzuki et al. ................. 348/272
2007/0183657 A1* 8/2007 Kidono et al. ................ 382/162
2008/0260298 A1* 10/2008 Kamon ........................ 382/321

FOREIGN PATENT DOCUMENTS

JP    2002-142228    5/2002
(Continued)

OTHER PUBLICATIONS

English Translation of an Office Action issued on Sep. 11, 2012 in the corresponding Japanese Patent Application No. 2010-510165.

*Primary Examiner* — David Czekaj
*Assistant Examiner* — Nam Pham
(74) *Attorney, Agent, or Firm* — Cozen O'Connor

(57) ABSTRACT

A luminance signal and a color information signal having high S/N ratios are generated by combining a visible luminance image component and an infrared image component at an appropriate ratio according to brightness of a subject such as brightness on a sunny day or brightness in darkness. An image pickup element 3 picks up a ye image component Dye, an R image component DR, an infrared image component DBlk and a luminance image component DW. An evaluation value calculator 41 calculates an evaluation value eDW and an evaluation value eDBlk by adding pixel values of the luminance image component DW and pixel values of the infrared image component DBlk in a local area, and calculates an evaluation value e (=eDW−eDBlk). A factor determiner 51 determines weighting factors k, kw from the evaluation value e. A signal generator 44 weights the luminance image component by the weighting factor k, weights the visible luminance image component by the weighting factor kw, combines the luminance image component and the visible luminance image component to calculate a luminance signal dY, and also calculates color signals dR, dG and dB.

6 Claims, 10 Drawing Sheets

(56) References Cited

FOREIGN PATENT DOCUMENTS

| | | | |
|---|---|---|---|
| JP | 2005-6066 A | | 1/2005 |
| JP | 2007-184805 A | | 7/2007 |
| JP | 2007-192713 | | 8/2007 |
| JP | 2007-202107 A1 | | 8/2007 |
| WO | WO 2009/133931 A1 | | 11/2009 |

* cited by examiner

FIG.2

$\underset{\sim}{3}$

| 31 | R | W | R | W |
|---|---|---|---|---|
| | Blk | ye | Blk | ye |
| | R | W | R | W |
| | Blk | ye | Blk | ye |

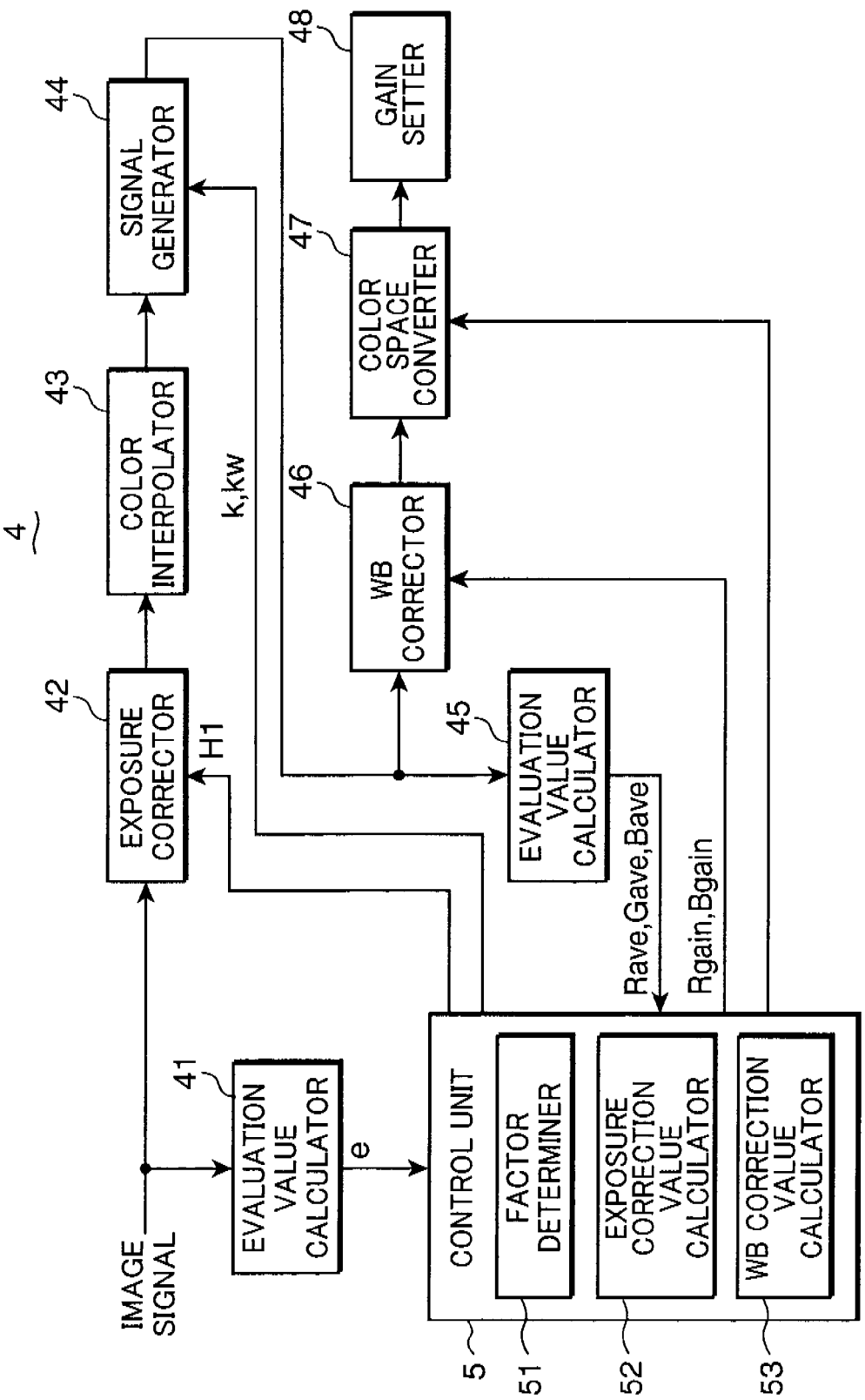

IMAGE PICKUP APPARATUS AND IMAGE PICKUP ELEMENT

RELATED APPLICATIONS

This is a U.S. National Phase under 35 U.S.C. §371 of International Application No. PCT/JP2009/058495, filed in the Japanese Patent Office on Apr. 30, 2009, which claims priority on Japanese Patent Application No. 2008-118773, filed on Apr. 30, 2008, and Japanese Patent Application No. 2008-227493, filed on Sept. 4, 2008.

TECHNOLOGICAL FIELD

The present invention relates to an image pickup element and an image pickup apparatus for processing an image picked up by the image pickup element.

Background Art

In recent years, there have been known image pickup apparatuses for picking up night-time scenes in color. Patent literature 1 discloses a color image reproducing apparatus provided with a visible image extractor for extracting a visible image data composed of R, G and B color components from an image picked up by pixels including R, G and B filters, an infrared image extractor for extracting an infrared image data from an image picked up by pixels including IR filters, a luminance information extractor for extracting first luminance information by HSV converting the visible image data and extracting second luminance information from the infrared image data, and a pseudo color image generator for generating a pseudo color image by weighting the first luminance information by a weighting factor w1 and weighting the second luminance information by a weighting factor w2 (w1+w2=1), wherein w1=1 on a sunny day, w1=0 in night-time darkness and 1>w1>0 in an intermediate state.

However, although patent literature 1 discloses to change the weighting factor according to fine weather or darkness, how to discriminate fine weather and darkness and how to determine the weighting factors w1, w2 based on the discriminated brightness are not disclosed at all. Thus, there has been a problem that a luminance component of a visible image and that of an infrared image cannot be combined at an appropriate ratio according to brightness of a subject.

In patent literature 1, a luminance component V is obtained by converting received light quantities of red, green and blue light receiving elements and including an infrared component to an HSV color space. However, since the R, G and B filters generally have different sensitivities in an infrared region, there are problems that the luminance component cannot be accurately obtained and color reproducibility is poor.

An object of the present invention is to provide an image pickup apparatus and an image pickup element capable of generating a luminance signal and a color information signal having high S/N ratios by combining a visible luminance image component and an infrared image component at an appropriate ratio according to brightness of a subject such as brightness on a sunny day or brightness in darkness.

PRIOR ART LITERATURE

Patent Literature 1:
    Japanese Unexamined Patent Publication No. 2007-184805

SUMMARY OF THE INVENTION

One aspect of the present invention is directed to an image pickup apparatus, comprising an image pickup element for picking up a visible color image component by pixels including color filters, an infrared image component by pixels including infrared filters and a luminance image component including a visible luminance image component and the infrared image component by pixels for receiving light at least in a visible wavelength region and an infrared wavelength region; an evaluation value calculator for calculating an evaluation value used to evaluate brightness of a subject based on the luminance image component and the infrared image component; a factor determiner for determining, using the evaluation value, a first weighting factor having a predetermined characteristic of increasing as the brightness of the subject increases and a second weighting factor having a predetermined characteristic of decreasing as the brightness of the subject increases; and a signal generator for generating the visible luminance image component by subtracting the infrared image component from the luminance image component, generating a luminance signal by combining the visible luminance image component weighted using the first weighting factor determined by the factor determiner and the luminance image component or the infrared image component weighted using the second weighting factor determined by the factor determiner and generating a color information signal by combining the visible color image component, the infrared image component and the luminance image component.

Another aspect of the present invention is directed to an image pickup element, characterized in that pixels including color filters, pixels including infrared filters and pixels for receiving light at least in a visible wavelength region and an infrared wavelength region are arrayed.

BRIEF DESCRIPTION OF THE DRAWINGS

FIG. 2 is a diagram showing an array of pixels of an image pickup element according to the first embodiment of the invention, FIG. 7 is a block diagram showing an image processing unit and a control unit according to a second embodiment of the invention.

MODES FOR CARRYING OUT THE INVENTION

Figure 1:
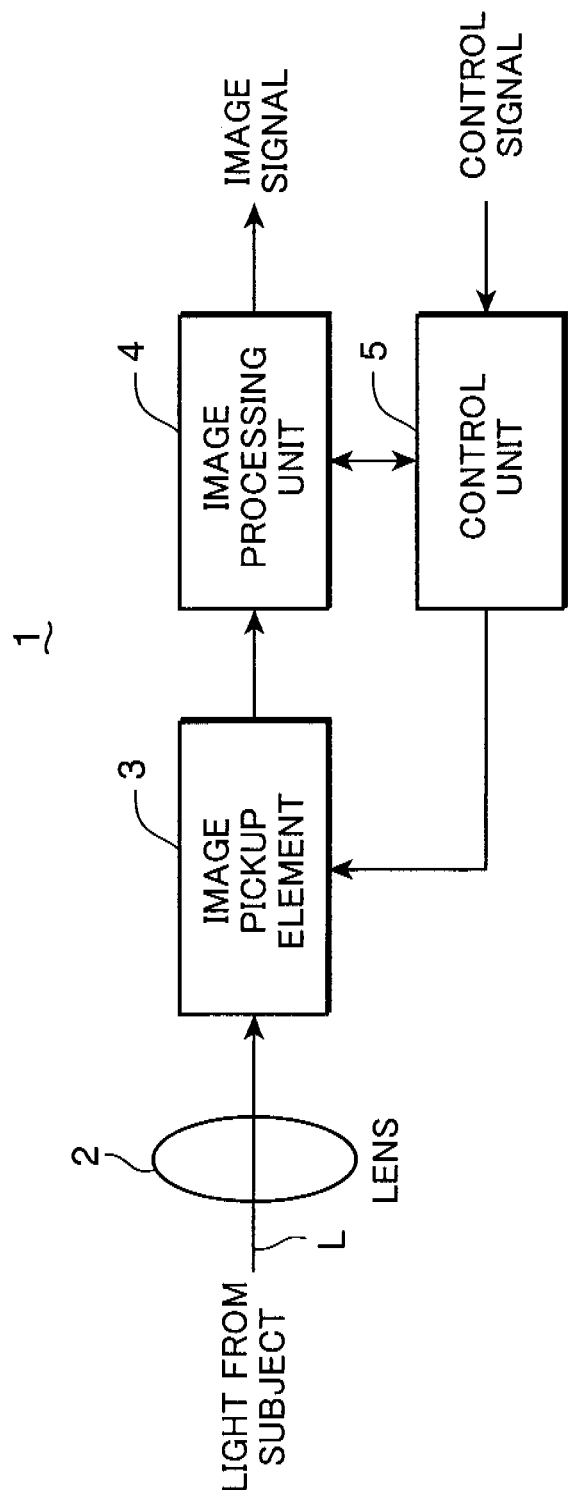
FIG. 1 is a block diagram of an image pickup apparatus according to a first embodiment of the invention.

First Embodiment
    Hereinafter, an image pickup apparatus 1 according to a first embodiment of the present invention is described. FIG. 1 is a block diagram of the image pickup apparatus 1 according to the first embodiment of the present invention. As shown in FIG. 1, the image pickup apparatus 1 includes a lens 2, an image pickup element 3, an image processing unit 4 and a control unit 5.

The lens 2 is composed of an optical lens system which receives an optical image of a subject and introduces it to the image pickup element 3. For example, a zoom lens and a focusing lens arranged in series along an optical axis L of an optical image of a subject, another fixed lens block or the like can be employed as the optical lens system. The lens 2 includes a diaphragm (not shown) for adjusting an amount of transmitting light and a shutter (not shown), and driving of the diaphragm and the shutter is controlled under the control of the control unit 5.

The image pickup element 3 includes a pixel section in which a plurality of pixels are arrayed in a matrix, a readout circuit for reading pixel signals out from the pixel section and a driving circuit for driving the image pickup element 3, and generates an image signal having a level corresponding to a light quantity. Here, various image pickup sensors such as a CMOS (Complementary Metal Oxide Semiconductor) image sensor, a VMIS (Threshold Voltage Modulation Image Sensor) and a CCD (Charge Coupled Device) image sensor can be employed as the image pickup element 3.

Each pixel includes a light receiving section composed of a PD (photodiode) and a pixel circuit for generating an image signal corresponding to electric charges accumulated by the light receiving section.

In this embodiment, the image pickup element 3 picks up a visible color image component by the pixels each including a color filter, an infrared image component by the pixels each including an infrared filter and a luminance image component including the visible luminance image component and the infrared image component by the pixels for receiving light at least in a visible wavelength region and an infrared wavelength region.

Here, each color filter is for permitting the passage of a part of light at least in the visible wavelength region. Each pixel for receiving light at least in the visible wavelength region and the infrared wavelength region can be easily realized by mounting no filter.

The image processing unit 4 includes an arithmetic circuit for operating an image signal and a memory for storing the image signal, A/D (analog/digital) converts an image signal output from the image pickup element 3 into a digital signal and outputs it to, for example, an unillustrated memory or display device after performing image processings to be described later thereon.

The control unit 5 includes a CPU (Central Processing Unit) and a memory for storing a program to be executed by the CPU, and outputs control signals for controlling the image pickup element 3 and the image processing unit 4 in response to a control signal from the outside. The control unit 5 also receives an evaluation value to be described later output from the image processing unit 4 and performs various processings to be described later based on the evaluation value.

FIG. 2 is a diagram showing an array of the pixels of the image pickup element 3. As shown in FIG. 2, the image pickup element 3 is such that unit pixel sections 31 each including a ye pixel (an example of a first pixel), an R pixel (an example of a second pixel), a Blk pixel (an example of a third pixel) and a W pixel (an example of a fourth pixel) having a visible wavelength region and an infrared wavelength region as a sensitive wavelength band are arrayed in a matrix.

In the case of FIG. 2, the R pixel, the Blk pixel, the W pixel and the ye pixel are so alternately arrayed in each unit pixel section 31 that the R pixel is arranged in the first row, first column, the Blk pixel is arranged in the second row, first column, the W pixel is arranged in the first row, second column and the ye pixel is arranged in the second row, second column. However, this is only an example and the R pixel, the Blk pixel, the W pixel and the ye pixel may be alternately arrayed in another pattern.

Since each ye pixel includes a ye filter (an example of a first color filter), it picks up a ye (yellow) visible color image component (hereinafter, called a "ye image component"). Since each R pixel includes an R filter (an example of a second color filter), it picks up an R (red) visible color image component (hereinafter, called an "R image component"). Since each Blk pixel includes a Blk filter (an example of an infrared filter), it picks up an infrared image component. Since each W pixel includes no filter, it can receive light at least in the visible wavelength region and the infrared wavelength region to pick up a luminance image component including a visible luminance image component and an infrared image component.

Figure 3:
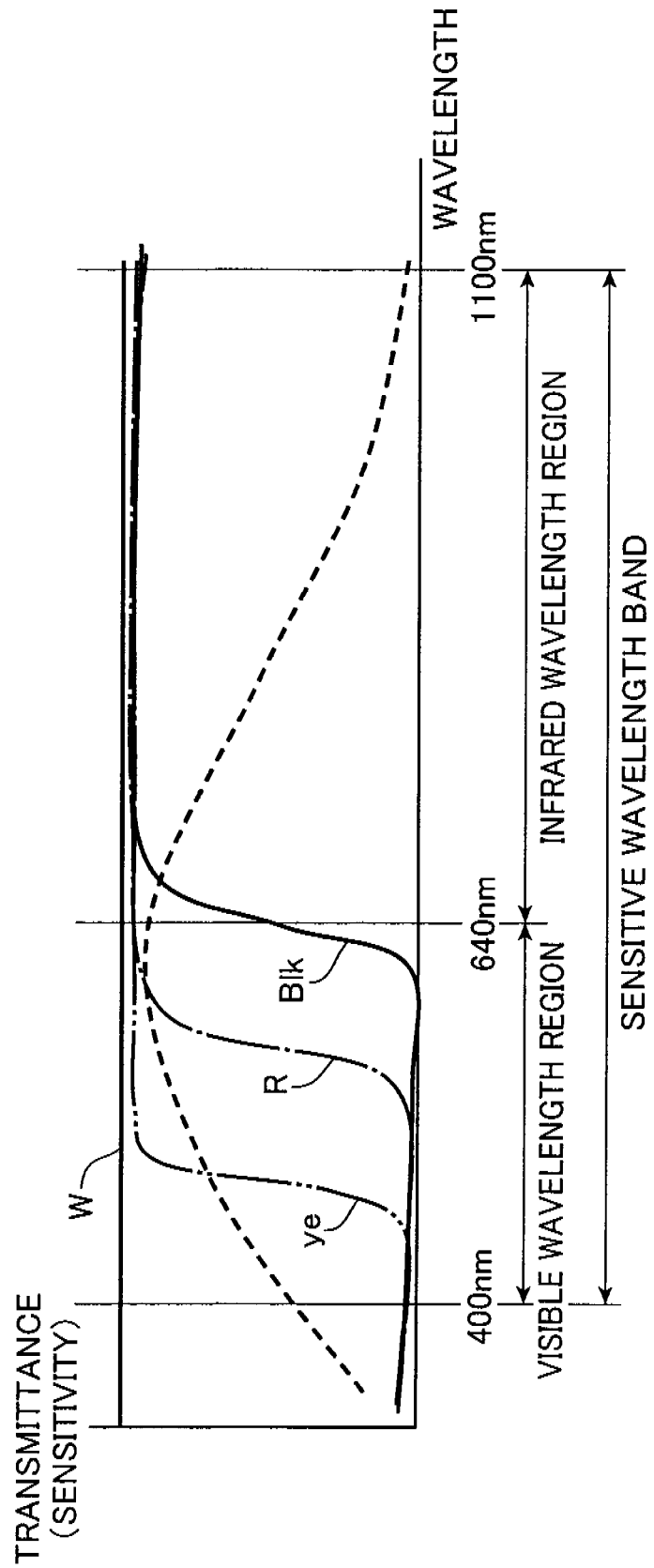
FIG. 3 is a graph showing spectral transmission characteristics of ye, R, Blk filters.

FIG. 3 is a graph showing spectral transmission characteristics of the ye, R and Blk filters, wherein a vertical axis represents transmittance (sensitivity) and a horizontal axis represents wavelength (nm). A graph shown by dotted line represents a spectral sensitivity characteristic of the pixel with the filter detached. This spectral sensitivity characteristic is understood to peak near 600 nm and change along an upwardly convex curve. In FIG. 3, it is assumed that the visible wavelength region is 400 nm to 640 nm, the infrared wavelength region is 640 nm to 1100 nm and the sensitive wavelength band is 400 nm to 1100 nm.

As shown in FIG. 3, the ye filter has a property of transmitting light in the sensitive wavelength band excluding a blue region of the visible wavelength region. Thus, the ye filter mainly transmits yellow light and infrared light.

The R filter has a property of transmitting light in the sensitive wavelength band excluding blue and green regions of the visible wavelength region. Thus, the R filter mainly transmits red light and infrared light.

The Blk filter has a property of transmitting light in the sensitive wavelength band excluding the visible wavelength region, i.e. light in the infrared wavelength region. W indicates a case where no filter is provided and all the light in the sensitive wavelength band from the pixel is transmitted.

Figure 4:
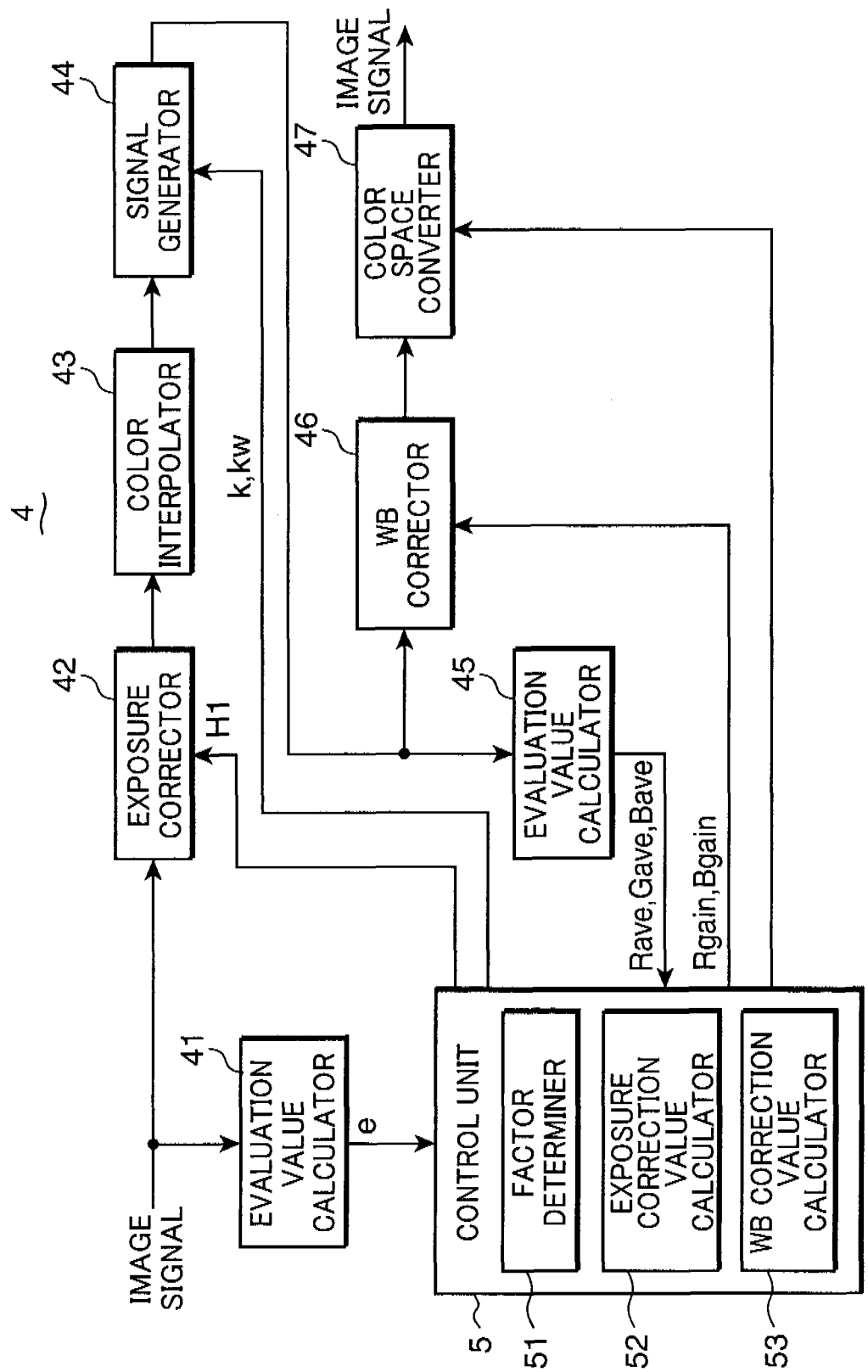
FIG. 4 is a block diagram showing an image processing unit and a control unit in the first embodiment.

FIG. 4 shows a block diagram of the image processing unit 4 and the control unit 5. The image processing unit 4 includes an evaluation value calculator 41, an exposure corrector 42, a color interpolator 43, a signal generator 44, an evaluation value calculator 45, a WB (White Balance) corrector 46 and a color space converter 47. The control unit 5 includes a factor determiner 51, an exposure correction value calculator 52 and a WB correction value calculator 53.

The evaluation value calculator 41 calculates an evaluation value used to evaluate brightness of a subject. Specifically, the evaluation value calculator 41 calculates an evaluation value eDW by adding pixel values of the W pixels, i.e. pixel values of the luminance image component and calculates an evaluation value eDBlk by adding pixel values of the Blk pixels, i.e. pixel values of the infrared image component in a local area composed of pixels in specified rows and specified columns in one frame of image picked up by the image pickup element 3, and outputs a value obtained by subtracting the evaluation value eDBlk from the evaluation value eDW as an evaluation value e (=eDW−eDBlk) to the control unit 5.

The factor determiner 51 determines a weighting factor k (an example of a first weighting factor) having a predetermined property of increasing according to brightness of a subject and a weighting factor kw (an example of a second weighting factor) having a predetermined property of decreasing according to brightness of the subject using the evaluation value e calculated by the evaluation value calculator 41.

Figure 5:
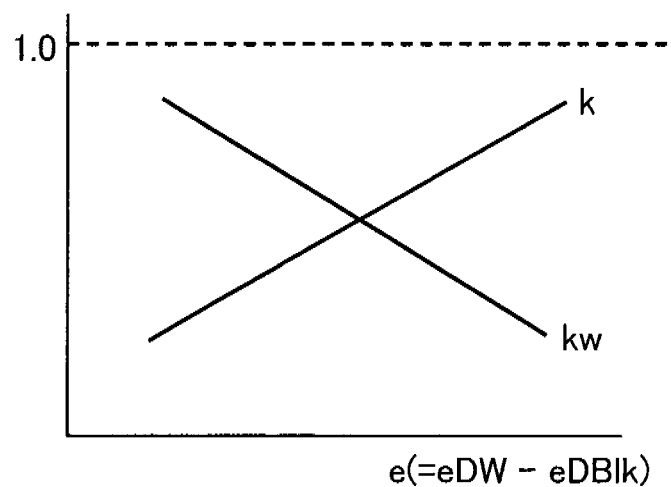
FIG. 5 is a graph showing characteristics of weighting factors k, kw, FIG. 6 are diagrams showing a process of a color space converter.

FIG. 5 is a graph showing characteristics of the weighting factors k, kw, wherein a vertical axis represents the weighting factors k, kw and a horizontal axis represents the evaluation value e (=eDW−eDBlk). It is understood from FIG. 5 that the weighting factor k has a property of, for example, linearly increasing as the evaluation value e increases and the weighting factor kw has a property of, for example, linearly decreasing as the evaluation value e increases.

In FIG. 5, empirically obtained predetermined values are employed as linear gradients indicating the characteristics of the weighting factors k, kw. Specifically, the weighting factors k, kw have a relationship of k+kw=1, and the linear gradients indicating the characteristics of the weighting factors k, kw are: k=1, kw=0 when the evaluation value e is largest and k=0, kw=1 when the evaluation value E is smallest.

The exposure correction value calculator 52 calculates a luminance evaluation value edY by substituting the weighting factors k, kw determined by the factor determiner 51 into the following equation, calculates an exposure correction value H1 by dividing the luminance evaluation value edY by a predetermined value and outputs it to the exposure corrector 42. Here, a total pixel number of DBlk pixels and DW pixels in the above local area can be employed as the predetermined value.

$$edY=kw\times eDW+k\times(eDW-eDBlk)$$

The exposure corrector 42 applies an exposure correction to the ye image component, the R image component, the infrared image component and the luminance image component picked up by the image pickup element 3 by multiplying the respective pixels of the ye image component, the R image component, the infrared image component and the luminance image component by the exposure correction value H1.

The color interpolator 43 performs an interpolation process on the respective R image component, infrared image component, luminance image component and ye image component to interpolate missing pixels of the alternately arrayed R pixels, Blk pixels, W pixels and ye pixels, thereby generating an R image component, an infrared image component, a luminance image component and a ye image component composed of the same number of pixels as the image pickup element 3. Here, a linear interpolation process may be, for example, employed as the interpolation process.

The signal generator 44 generates a visible luminance image component by subtracting the infrared image component from the luminance image component on both of which the interpolation process was performed by the color interpolator 43.

The signal generator 44 weights the visible luminance image component (DW−DBlk) using the weighting factor k determined by the factor determiner 51, weights the luminance image component DW using the weighting factor kw determined by the factor determiner 51 and combines the visible luminance image component (DW−DBlk) and the luminance image component DW by equation (1) to generate a luminance signal dY of each pixel.

Further, the signal generator 44 combines a ye image component Dye, an R image component DR, the infrared image component DBlk and the luminance image component DW on each of which the interpolation process was performed by the color interpolate 43 using equation (2) to generate color signals dB, dR and dG (an example of a color information signal) of the respective pixels of R (red), G (green) and B (blue).

$$dY=kw\times DW+k\times(DW-DBlk) \quad (1)$$

$$dB=DW-Dye-DBlk$$

$$dR=DR-DBlk \quad (2)$$

$$dG=DW-DBlk-dR-dB$$

Note that the signal generator 44 may calculate the luminance signal dY by dY=kw×DBlk+k×(DW−DBlk) instead of by equation (1), i.e. may calculate the luminance signal dY by weighting the infrared image component DBlk instead of the luminance image component DW using the weighting factor kw.

In any case, the weighting factor k increases as the evaluation value e indicating the size of the visible luminance image component (DW−DBlk) increases while decreasing as the evaluation value e indicating the size of the visible luminance image component (DW−DBlk) increases.

Thus, if a subject is bright such as on a sunny day, a ratio of the visible luminance image component (DW−DBlk) in the luminance signal dY increases and an image equivalent to the viewed subject can be obtained.

On the other hand, if a subject is dark such as in darkness, a ratio of the infrared image component DBlk in the luminance signal dY increases and an image having a good S/N ratio can be obtained by using many luminance signals in the infrared region.

The evaluation value calculator 45 adds the color signals dR, dG and dB of the respective pixels to calculate an addition value Rave of the color signals dR, an addition value Gave of the color signals dG and an addition value Bave of the color signals dB and outputs them to the control unit 5.

The WB correction value calculator 53 calculates an R gain Rgain and a B gain Bgain from the addition values Rave, Gave and Bave by the following equations.

$$Rgain=Gave\div Rave$$

$$Bgain=Gave\div Bave$$

The WB corrector 46 corrects the color signals dR of the respective pixels generated by the signal generator 44 by multiplying the color signals dR by the gain Rgain calculated by the WB correction value calculator 53. The WB corrector 46 also corrects the color signals dB of the respective pixels generated by the signal generator 44 by multiplying the color signals dB by the gain Bgain calculated by the WB correction value calculator 53. In this way, a WB correction is applied to the color signals dR, dG and dB based on the color signals dG.

The WB corrector 46 may apply the WB correction based on the color signals dR or color signals dB instead of the color signals dG. In this case, the WB correction value calculator 53 may calculate gains corresponding to the color signals dR or dB that serve as a basis.

The color space converter 47 determines 12 factors k1 to k12, which are predetermined to increase the weight of the visible luminance image component in the luminance signal dY generated by the signal generator 44 as the visible luminance image component increases, based on the evaluation value e or the weighting factors k, kw, and converts the luminance signal dY and the color signals dR, dG and dB into a color space represented by a luminance signal Y and color difference signals Cb, Cr (an example of a color information signal) by the following equations using the determined factors k1 to k12. Here, the color difference signal Cb denotes a blue color difference signal, the color difference signal Cr denotes a red color difference signal and the luminance signal Y denotes a luminance signal corresponding to the color difference signals Cb, Cr.

$$Y = k1 \times dY + k2 \times dR + k3 \times dG + k4 \times dB$$

$$Cb = k5 \times dY + k6 \times dR + k7 \times dG + k8 \times dB$$

$$Cr = k9 \times dY + k10 \times dR + k11 \times dG + k12 \times dB \quad (3)$$

Figure 6B:
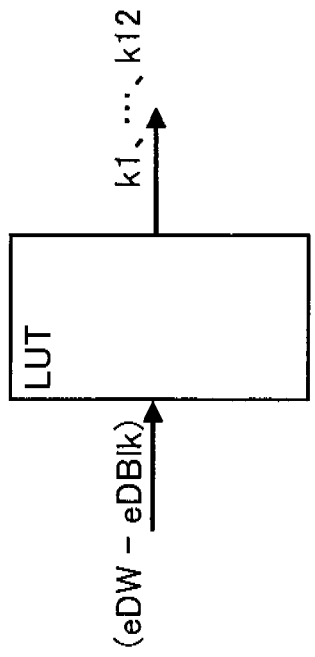
Figure 6A:
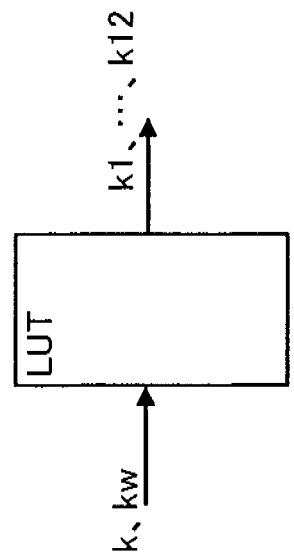

Here, the color space converter 47 may determine the factors k1 to k12 using a LUT storing values of the 12 factors k1 to k12 predetermined according to the evaluation value e (=eDW−eDBlk) as shown in FIG. 6A.

The color space converter 47 may also determine the factors k1 to k12 from the weighting factors k, kw instead of from the evaluation value e. In this case, the color space converter 47 may determine the factors k1 to k12 using a LUT storing values of the 12 factors k1 to k12 predetermined according to the values of the weighting factors k, kw as shown in FIG. 6B.

Next, the operation of the image pickup apparatus 1 is described. First of all, the control unit 5 causes the image pickup element 3 to pick up one frame of image. Here, the image pickup element 3 picks up a ye image component Dye by the ye pixels, an R image component DR by the R pixels, an infrared image component DBlk by the Blk pixels and a luminance image component DW by the W pixels. When the image pickup apparatus 1 picks up moving images, the control unit 5 may cause the image pickup element 3 to pick up images at a frame rate of, e.g. 1/30 s or 1/60 s. When the image pickup apparatus 1 picks up a still image, the control unit 5 may cause the image pickup element 3 to pick up the image when a release button is pressed by a user.

Subsequently, the evaluation value calculator 41 calculates the evaluation value eDW and the evaluation value eDBlk by adding the pixel values of the luminance image component DW and the pixel values of the infrared image component DBlk in the local area, and calculates the evaluation value e (=eDW−eDBlk).

Subsequently, the factor determiner 51 determines the weighting factors k, kw from the evaluation value e. Subsequently, the exposure correction value calculator 52 calculates the exposure correction value H1 from the weighting factors k, kw.

Subsequently, the exposure corrector 42 applies an exposure correction to the ye image component Dye, the R image component DR, the infrared image component DBlk and the luminance image component DW by multiplying the respective pixels of the ye image component Dye, the R image component DR, the infrared image component DBlk and the luminance image component DW by the exposure correction value H1.

Subsequently, the color interpolator 43 performs the interpolation process on the ye image component Dye, the R image component DR, the infrared image component DBlk and the luminance image component DW each having the exposure correction applied thereto.

Subsequently, the signal generator 44 calculates the luminance signal dY of each pixel by equation (1) and calculates the color signals dR, dG and dB by equation (2).

Subsequently, the evaluation value calculator 45 calculates the addition values Rave, Gave and Bave. Subsequently, the WB correction value calculator 53 calculates the gains Rgain, Bgain using the addition values Rave, Gave and Bave. Subsequently, the WB corrector 46 applies a WB correction to the color signals dR, dG and dB of each pixel using the gains Rgain, Bgain.

Subsequently, the color space converter 47 determines the factors k1 to k12 and converts the color space of the luminance signal dY and the color signals dR, dG and dB to obtain the luminance signal Y and the color difference signals Cb, Cr.

As described above, according to the image pickup apparatus 1, when a subject is bright such as on a sunny day, a ratio of a visible luminance image component in a luminance signal increases and an image equivalent to the viewed subject can be obtained.

On the other hand, when a subject is dark such as in darkness, a ratio of an infrared image component in a luminance signal increases and an image having a good S/N ratio can be obtained using many luminance signals in the infrared region.

The color signals are generated by combining the visible color image component, the infrared image component and the luminance image component. The luminance image component is picked up by the pixels that receive light at least in the visible wavelength region and the infrared wavelength region and the color filters having the same sensitivity characteristic as the infrared component are employed. Thus, the visible color image component can be accurately obtained by subtracting the infrared image component from the visible color image component. Since the color signals are generated from this visible color image component, it is possible to obtain color signals with high color reproducibility.

Although the factor determiner 51 determines the weighting factors k, kw for each frame of image in the above description, the present invention is not limited to this and weighting factors k, kw may be calculated for each pixel constituting one frame of image.

In this case, the color interpolator 43 may be provided at a previous stage of the evaluation value calculator 41 and the evaluation value calculator 41 may calculate the evaluation value e in each pixel by subtracting the infrared image component DBlk from the luminance image component DW in each pixel. Then, the factor determiner 51 may determine the weighting factors k, kw in each pixel from the evaluation value e in each pixel.

Then, the signal generator 44 may calculate the luminance signal dY by equation (1) using the weighting factors k, kw in each pixel.

Further, the exposure correction value calculator 52 may calculate the luminance evaluation value edY in each pixel from the weighting factors k, kw in each pixel and calculate the exposure correction value H1 in each pixel.

The exposure corrector 42 may apply an exposure correction by multiplying each pixel of the ye image component, the R image component, the infrared image component and the luminance image component by the exposure correction value H1 in each pixel.

The color space converter 47 may determine the factors k1 to k12 in each pixel from the weighting factors k, kw or the evaluation value e in each pixel and perform the color space conversion.

The evaluation value calculator 41 may calculate the evaluation value e using only the infrared image component in the local area or calculate the evaluation value e using only the visible luminance image component in the local area.

Second Embodiment

An image pickup apparatus 1 according to a second embodiment of the present invention is characterized by setting gains of color difference signals (an example of a color information signal) based on at least either one of brightness and darkness of a subject. In the second embodiment, the same construction as in the first embodiment is not described.

FIG. 7 is a block diagram showing an image processing unit 4 and a control unit 5 in this embodiment. A point of difference from FIG. 4 is that a gain setter 48 is provided. The gain setter 48 increases gains of color difference signals as brightness of a subject increases.

Specifically, the gain setter 48 calculates gains αb, αr for color difference signals Cb, Cr calculated by a color space converter 47 using an evaluation value e (=eDW−eDBlk) calculated by an evaluation value calculator 41, and sets the calculated gains αb, αr as the gains of the respective color difference signals Cb, Cr.

The gain setter 48 corrects the color difference signals Cb, Cr by multiplying the color difference signal Cb by the set gain αb and multiplying the color difference signal Cr by the set gain αr as shown in equation (4).

$$Cb' = \alpha b \times Cb$$

$$Cr' = \alpha r \times Cr \quad (4)$$

Figure 8:
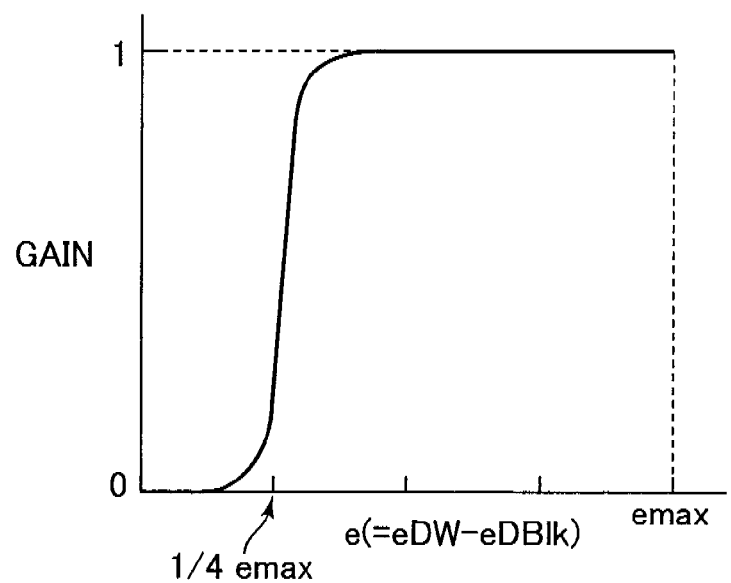
FIG. 8 is a graph showing characteristics of gains at an evaluation value e.

FIG. 8 is a graph showing characteristics of the gains αb, αr with respect to the evaluation value e, wherein a vertical axis represents the gain and a horizontal axis represents the evaluation value e. As shown in FIG. 8, the gains αb, αr have the same characteristic of increasing as the evaluation value e increases, i.e. as brightness of a subject increases. Specifically, the gains αb, αr are 0 in a range below ¼ of emax that is a maximum value of the evaluation value e. When the evaluation value e reaches near ¼ of emax, the gains αb, αr moderately increase, then drastically increase up to a value immediately under 1 and then moderately increase again to reach 1.

Accordingly, the gain setter 48 may obtain the gains αb, αr using a look-up table stored beforehand and indicating an empirically obtained relationship of the gains αb, αr and the evaluation value e. Alternatively, a function indicating the relationship between the gains αb, αr and the evaluation value e shown in FIG. 8 may be stored beforehand and the gains αb, αr may be calculated using this function.

In this way, the gains αb, αr of the color difference signals Cb, Cr increase when a subject is bright and S/N ratios of the color difference signals Cb, Cr are high, whereas color difference signals having high S/N ratios can be obtained due to a decrease in the gains αb, αr of the color difference signals Cb, Cr when a subject is dark and the S/N ratios of the color difference signals Cb, Cr are low.

In FIG. 8, the gains αb, αr drastically change when the evaluation value e is near ¼ of emax. However, without being limited to this, the gains αb, αr may drastically change when the evaluation value e is near another value such as ½ of emax or ⅓ of emax other than ¼ of emax.

Further, the gains αb, αr may have different characteristics. In this case, the gains αb, αr preferably have such characteristics as to maintain a white balance.

Figure 9:
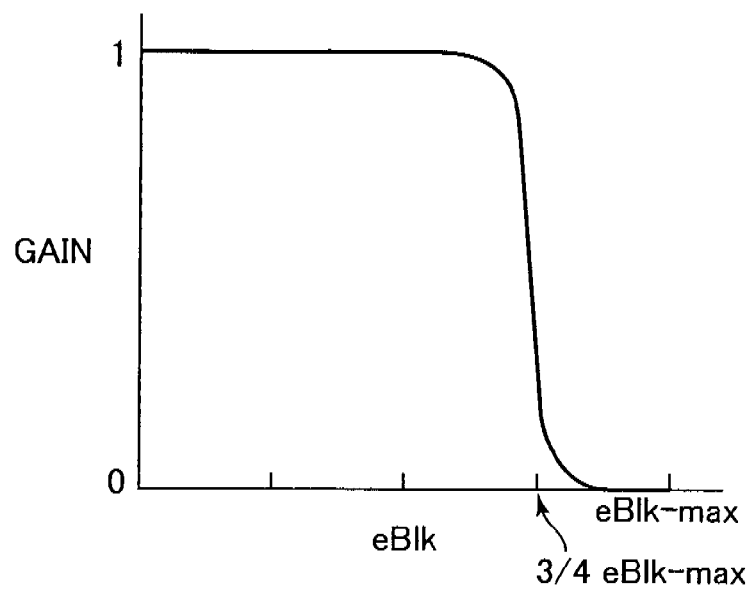
FIG. 9 is a graph showing characteristics of the gains at an evaluation value eBlk.

The gain setter 48 uses the evaluation value e in the above description. However, without being limited to this, the gains αb, αr may be calculated using the evaluation value eBlk calculated by the evaluation value calculator 41. FIG. 9 is a graph showing characteristics of the gains αb, αr with respect to the evaluation value eBlk, wherein a vertical axis represents the gains αb, αr and a horizontal axis represents the evaluation value eBlk. It can be understood from FIG. 9 that the gains αb, αr decrease as the evaluation value eBlk increases, i.e. as darkness of a subject increases.

Specifically, the gains αb, αr are 1 in a range below ¾ of eBlk−max that is a maximum value of the evaluation value eBlk. When the evaluation value eBlk reaches near ¾ of eBlk−max, the gains αb, αr moderately decrease from 1, then drastically decrease to a value immediately above 0 and moderately decrease again.

Accordingly, as in the case of the evaluation value e, the gain setter 48 may calculate the gains αb, αr using a look-up table or a function prepared and stored beforehand and indicating the relationship between the gains αb, αr and the evaluation value eBlk shown in FIG. 9.

The gain setter 48 calculates the gains αb, αr using the evaluation value e or eBlk. However, without being limited to this, the gains αb, αr may be calculated using a parameter other then the evaluation values e, eBlk provided that this parameter indicates brightness of a subject.

For example, the weighting factors k, kw are determined using the evaluation value e and have values reflecting brightness of a subject. Accordingly, the gain setter 48 may calculate αb, αb using the weighting factor k or kw. In this case, the gain setter 48 may calculate the gains αb, αr using a look-up table or a function stored beforehand and indicating a relationship between the weighting factor k or kw and the gains αb, αr.

Figure 11:
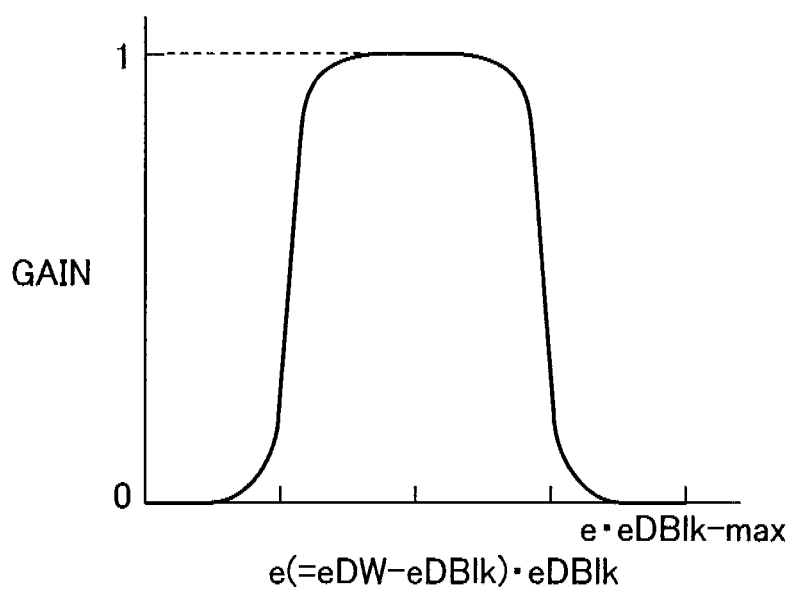
FIG. 11 is a graph showing characteristics of the gains at a multiplication value e·eBlk.

Further, the gain setter 48 may calculate the gains αb, αr based on both brightness and darkness of a subject. Specifically, the gains αb, αr may be calculated based on a multiplication value of the evaluation values e and eBlk (=e·eBlk). FIG. 11 is a graph showing characteristics of the gains αb, αr with respect to the multiplication value e·eBlk, wherein a vertical axis represents the gains αb, αr and a horizontal axis represents the multiplication value e·eBlk.

As shown in FIG. 11, the gains αb, αr have characteristics obtained by multiplying the graph shown in FIG. 8 and that shown in FIG. 9. Namely, the gains αb, αr having such convex characteristics as to peak at 1 when the multiplication value e·eBlk is ½ of the maximum value (e·eBlk−max) of the multiplication value e·eBlk and laterally symmetrically decrease from ½ of e·eBlk−max as a center.

By having such characteristics, the gains αb, αr can be calculated in consideration of both the evaluation values e and eBlk.

In this case, as in the case of the evaluation value e or eBlk, the gain setter 48 may calculate the gains αb, αr using a look-up table or a function prepared and stored beforehand and indicating the relationship between the gains αb, αr and the multiplication value e·eBlk.

(Third Embodiment)

Figure 10:
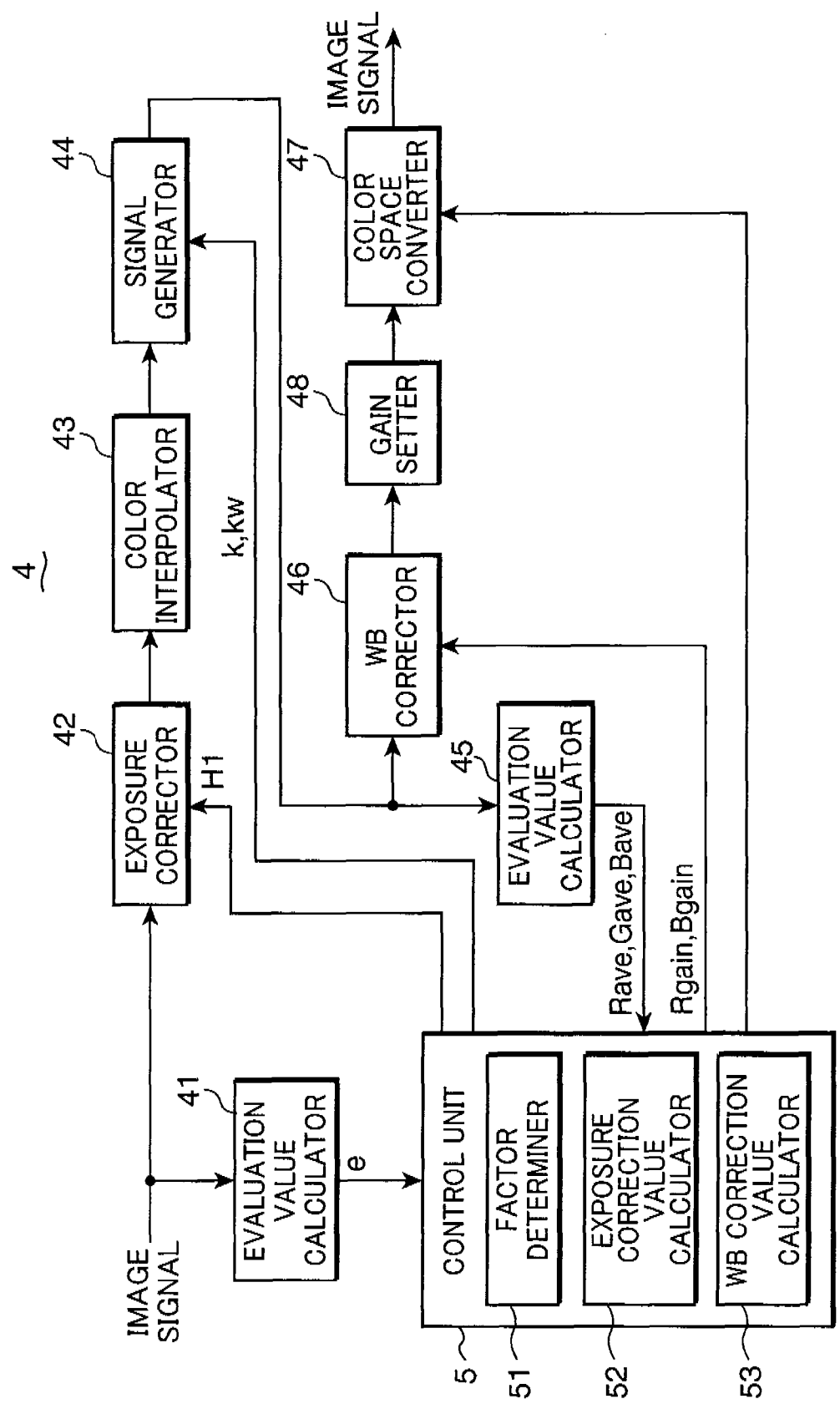
FIG. 10 is a block diagram showing an image processing unit and a control unit according to a third embodiment of the invention.

FIG. 10 is a block diagram showing a control unit 5 and an image processing unit 4 of an image pickup apparatus 1 according to a third embodiment of the present invention. The image pickup apparatus 1 of the third embodiment is characterized by providing a gain setter 48 between a WB corrector 46 and a color space converter 47.

In this embodiment, the gain setter 48 is characterized by setting larger gains βr, βg and βb of color signals dR, dG and dB (an example of a color information signal) corrected by the WB corrector 46 as brightness of a subject increases.

In this case, the gain setter 48 may calculate the gains βr, βg and βb using an evaluation value e calculated by an evaluation value calculator 41. Specifically, the gain setter 48 may calculate the gains βr, βg and βb with respect to the evaluation value e using a look-up table or a function stored beforehand and indicating a relationship between the gains βr, βg and βb and the evaluation value e. Then, the gain setter 48 may correct the color signals dR, dG and dB by multiplying the color signals dR, dG and dB output from the WB corrector 46 by the calculated gains βr, βg and βb as shown in equations (5).

$$dR'=\beta r \times dR$$

$$dG'=\beta g \times dG$$

$$dB'=\beta b \times dB \quad (5)$$

At this time, the color space converter 47 may calculate color difference signals Cr, Cb and a luminance signal Y using the color signals dR', dG' and dB'.

Characteristics similar to those of the gains αr, αb shown in FIG. 8 may be employed as characteristics of the gains βr, βg and βb with respect to the evaluation value e.

The gain setter 48 may calculate the gains βr, βg and βb using the evaluation value eBlk instead of the evaluation value e. In this case, the gains βr, βg and βb may have such characteristics as to decrease as the evaluation value eBlk increases similar to the characteristics shown in FIG. 9. The gain setter 48 may calculate the gains βr, βg and βb corresponding to the evaluation value eBlk using a look-up table or a function stored beforehand and indicating a relationship between the gains βr, βg and βb and the evaluation value eBlk.

Similar to the second embodiment, the gains βr, βg and βb may be calculated using a parameter other than the evaluation values e, eBlk, e.g. the weighting factor k, kw also in this embodiment provided that this parameter indicates brightness of a subject.

The gains βr, βg and βb may be calculated based on a multiplication value e·eBlk of the evaluation values e and eBlk. In this case, the gains βr, βg and βb may have the same characteristic as the one shown in FIG. 11. The gain setter 48 may calculate the gains βr, βg and βb corresponding to the multiplication value e·eBlk using a function or a look-up table stored beforehand and indicating a relationship between the multiplication value e·eBlk and the gains βr, βg and βb.

As described above, according to the image pickup apparatus 1 of this embodiment, the color signals dR, dG and dB having high S/N ratios can be obtained.

In this embodiment, the weighting factors k, kw are calculated from the evaluation value e as shown in FIG. 5 and the luminance signal dY is calculated using the weighting factors k, kw. However, without being limited to this, the luminance signal dY may be calculated from the evaluation value e without using the weighting factors k, kw.

In this case, the signal generator 44 may calculate the luminance signal dY, for example, using a look-up table or a function indicating a predetermined relationship of the luminance image component DW, the infrared image component DBlk and the luminance signal dY. Namely, the signal generator 44 may calculate the luminance signal dY using such a look-up table or function whose inputs are the luminance image component DW and the infrared image component DBlk and whose output is the luminance signal dY.

Technical features of the above image pickup apparatuses are summarized as follows.

(1) The above image pickup apparatus comprises an image pickup element for picking up a visible color image component by pixels including color filters, an infrared image component by pixels including infrared filters and a luminance image component including a visible luminance image component and the infrared image component by pixels for receiving light at least in a visible wavelength region and an infrared wavelength region; an evaluation value calculator for calculating an evaluation value used to evaluate brightness of a subject based on the luminance image component and the infrared image component; a factor determiner for determining, using the evaluation value, a first weighting factor having a predetermined characteristic of increasing as the brightness of the subject increases and a second weighting factor having a predetermined characteristic of decreasing as the brightness of the subject increases; and a signal generator for generating the visible luminance image component by subtracting the infrared image component from the luminance image component, generating a luminance signal by combining the visible luminance image component weighted using the first weighting factor determined by the factor determiner and the luminance image component or the infrared image component weighted using the second weighting factor determined by the factor determiner and generating a color information signal by combining the visible color image component, the infrared image component and the luminance image component.

According to this construction, the evaluation value used to evaluate the brightness of the subject is calculated based on the visible luminance image component and the infrared image component and the first and second weighting factors are determined based on this evaluation value. Here, the first weighting factor has the characteristic of increasing as the brightness of the subject increases and the second weighting factor has the characteristic of decreasing as the brightness of the subject increases. Then, the visible luminance image component weighted by the first weighting factor and the luminance image component weighted by the second weighting factor are combined to generate the luminance signal.

Thus, when a subject is bright such as on a sunny day, a ratio of the visible luminance image component in the luminance signal increases and an image equivalent to the viewed subject can be obtained.

On the other hand, when a subject is dark such as in darkness, a ratio of the infrared image component in the luminance signal increases and an image having a good S/N ratio can be obtained using many luminance signals in the infrared region. In other words, when a subject is dark, the visible luminance image component is thought not to include much information on the subject, i.e. thought to include much noise. Accordingly, when the subject is dark, the luminance signal is generated by combining the infrared image component and the visible luminance image component in such a manner as to increase the ratio of the infrared image component while decreasing the ratio of the visible luminance image component. In this way, a luminance signal having a high S/N ratio can be obtained.

Further, since the luminance image component is picked up by the pixels for receiving light at least in the visible wavelength region and the infrared wavelength region without being dispersed, a luminance signal having a higher S/N ratio can be obtained as compared with the case where a luminance signal is obtained from an image component picked up by pixels including R, G, B and IR filters while being dispersed.

Specifically, as can be understood by combining sensitivity characteristics of the R, G, B and IR filters, there are ranges in the visible region where a luminance signal cannot be obtained using only these filters. On the other hand, a sensitivity characteristic of the pixels for receiving light at least in the visible wavelength region and the infrared wavelength region covers the entire visible region and infrared region. Thus, an image picked up by the pixels for receiving light at least in the visible wavelength region and the infrared wavelength region includes a large amount of information in the visible region as compared with an image picked up by pixels including the R, G, B and IR filters, wherefore a luminance signal having a high S/N ratio can be generated.

The color information signal is generated by combining the visible color image component, the infrared image component and the luminance image component. Since the luminance image component is picked up by the pixels for receiving light at least in the visible wavelength region and the infrared wavelength region, a color information signal having a high S/N ratio can be obtained. Particularly, if color filters having the same sensitivity characteristic as an infrared component are employed, the visible color image component can be accurately obtained by subtracting the infrared image component from the visible color image component, and a color information signal having a high S/N ratio can be obtained by being generated from this visible color image component.

(2) Preferably, the image pickup element is such that unit pixel sections each including a first pixel, a second pixel, a third pixel and a fourth pixel and having the visible wavelength region and the infrared wavelength region as a sensitive wavelength band are arrayed in a matrix; each first pixel includes a first color filter for transmitting light in the sensitive wavelength band excluding a blue region of the visible wavelength region; each second pixel includes a second color filter for transmitting light in the sensitive wavelength band excluding blue and green regions of the visible wavelength region; each third pixel includes a third color filter for transmitting light in the sensitive wavelength band excluding the visible wavelength region; and each fourth pixel is a pixel for receiving light at least in the visible wavelength region and the infrared wavelength region.

According to this construction, since each first pixel includes the first color filter, it can pick up an image in the sensitive wavelength band excluding the blue region as the visible color image component. Since each second pixel includes the second color filter, it can pick up an image in the sensitive wavelength band excluding the blue and green regions as the color image component. Since each third pixel includes the third color filter, it can pick up an image in the sensitive wavelength band excluding the visible wavelength region as the infrared image component. Since each fourth pixel receives light at least in the visible wavelength region and the infrared wavelength region, it can pick up an image in the sensitive wavelength band as the luminance image component.

Since the image pickup element is such that the unit pixel sections each including the first to fourth pixels are arranged in a matrix, the visible color image component, the infrared image component and the luminance image component can be picked up in an unbiased manner.

(3) It is preferable to further comprise an exposure correction value calculator for calculating an exposure correction value based on the first and second weighting factors determined by the factor determiner; and an exposure corrector for applying an exposure correction to an image picked up by the image pickup element using the exposure correction value calculated by the exposure correction value calculator.

According to this construction, the exposure correction value is calculated using the first and second weighting factors determined by the factor determiner, and the exposure correction is applied using this exposure correction value, wherefore the exposure correction can be applied using an appropriate exposure correction value corresponding to brightness of a subject such as brightness on a sunny day or brightness in darkness.

(4) It is preferable to further comprise a white balance correction value calculator for calculating a white balance correction value based on the color information signal generated by the signal generator; and a white balance corrector for applying a white balance correction to an image picked up by the image pickup element using the white balance correction value calculated by the white balance correction value calculator.

According to this construction, since the white balance correction value is calculated based on the color signal having a high S/N ratio and generated by the signal generator and the white balance correction is applied, the white balance correction can be accurately applied.

(5) The signal generator preferably generates the luminance signal using the following equation:

$$dY = kw \times DW + k \times (DW - DBlk)$$

where dY: luminance signal, k: first weighting factor, kw: second weighting factor, DW: luminance image component, DBlk: infrared image component; DW−DBlk: visible luminance image component.

According to this construction, the luminance image component weighted by the first weighting factor and the visible luminance image component weight by the second weighting factor can be appropriately combined.

(6) Preferably, the color information signal includes color signals dR, dG and dB and color difference signals Cb, Cr; and the image pickup apparatus further comprises a color space converter for determining 12 factors k1 to k12, which are predetermined to increase the weights of the visible luminance image component in the luminance signal dY generated by the signal generator as the visible luminance image component increases, based on the evaluation value or the first and second weighting factors and converting the luminance signal dY and the color signals dR, dG and dB into a color space represented by a luminance signal Y and the color difference signals Cb, Cr by the following equations using the determined factors k1 to k12:

$$Y = k1 \times dY + k2 \times dR + k3 \times dG + k4 \times dB$$

$$Cb = k5 \times dY + k6 \times dR + k7 \times dG + k8 \times dB$$

$$Cr = k9 \times dY + k10 \times dR + k11 \times dG + k12 \times dB.$$

According to this construction, the luminance signal dY and the color signals dR, dB and dG are converted into the color space of the luminance signal Y and the color difference signals Cb, Cr using the 12 factors k1 to k12 predetermined to increase the weight of the visible luminance image component as the visible luminance image component increases. Thus, it is possible to obtain appropriate luminance signal Y and color difference signals Cb, Cr according to brightness of a subject such as brightness on a sunny day or brightness in darkness.

(7) The factor determiner preferably calculates the evaluation value in each pixel and determines the first and second weighting factors in each pixel.

According to this construction, since the first and second weighting factors are determined for each pixel, a luminance signal can be obtained using appropriate first and second weighting factors for each pixel.

(8) It is preferable to further comprise a gain setter for setting a gain of the color information signal based on at least either one of brightness and darkness of a subject.

In the case of a dark subject, the color signal is thought not to include much information on the subject, i.e. thought to include much noise. Accordingly, a color information signal having a high S/N signal can be obtained by setting the gain of the color information signal based on at least either one of brightness and darkness of the subject. Specifically, the gain of the color information signal may be increased as the subject becomes brighter, or it may be decreased as the subject becomes darker.

(9) An image pickup element according to another aspect of the present invention is characterized in that pixels including color filters, pixels including infrared filters and pixels for receiving light at least in a visible wavelength region and an infrared wavelength region are arrayed.

According to this construction, an image pickup element can be provided which can generate a luminance signal and a color information signal having high S/N ratios.

What is claimed is:

1. An image pickup apparatus, comprising:
   an image pickup element for picking up a visible color image component by pixels including color filters, an infrared image component by pixels including infrared filters and a luminance image component including a visible luminance image component and the infrared image component by pixels for receiving light at least in a visible wavelength region and an infrared wavelength region;
   an evaluation value calculator for calculating an evaluation value used to evaluate brightness of a subject based on the luminance image component and the infrared image component;
   a factor determiner for determining, using the evaluation value, a first weighting factor having a predetermined characteristic of increasing as the brightness of the subject increases and a second weighting factor having a predetermined characteristic of decreasing as the brightness of the subject increases; and
   a signal generator for generating the visible luminance image component by subtracting the infrared image component from the luminance image component DW−DBlk, generating a luminance signal by combining the visible luminance image component weighted using the first weighting factor determined by the factor determiner and the luminance image component or the infrared image component weighted using the second weighting factor determined by the factor determiner and generating a color information signal by combining the visible color image component, the infrared image component and the luminance image component;
   wherein:
   the image pickup element is such that unit pixel sections each including a first pixel, a second pixel, a third pixel and a fourth pixel and having the visible wavelength region and the infrared wavelength region as a sensitive wavelength band are arrayed in a matrix;
   each first pixel includes a first color filter for transmitting light in the sensitive wavelength band excluding a blue region of the visible wavelength region;
   each second pixel includes a second color filter for transmitting light in the sensitive wavelength band excluding blue and green regions of the visible wavelength region;
   each third pixel includes a third color filter for transmitting light in the sensitive wavelength band excluding the visible wavelength region; and
   each fourth pixel is a pixel for receiving light at least in the visible wavelength region and the infrared wavelength region.

2. An image pickup apparatus according to claim 1, further comprising:
   an exposure correction value calculator for calculating an exposure correction value based on the first and second weighting factors determined by the factor determiner; and
   an exposure corrector for applying an exposure correction to an image picked up by the image pickup element using the exposure correction value calculated by the exposure correction value calculator.

3. An image pickup apparatus according to claim 1, further comprising:
   a white balance correction value calculator for calculating a white balance correction value based on the color information signal generated by the signal generator; and
   a white balance corrector for applying a white balance correction to an image picked up by the image pickup element using the white balance correction value calculated by the white balance correction value calculator.

4. An image pickup apparatus according to claim 1, wherein:
   the color information signal includes color signals dR, dG and dB for red, green and blue respectively, and color difference signals Cb, Cr for blue and red respectively; and
   the image pickup apparatus further comprises a color space converter for determining 12 factors k1 to k12, which are predetermined to increase the weights of the visible luminance image component in the luminance signal dY generated by the signal generator as the visible luminance image component increases, based on the evaluation value or the first and second weighting factors and converting the luminance signal dY and the color signals dR, dG and dB into a color space represented by a luminance signal Y and the color difference signals Cb, Cr by the following equations using the determined factors k1 to k12:

$Y = k1 \times dY + k2 \times dR + k3 \times dG + k4 \times dB$ $Cb = k5 \times dY + k6 \times dR + k7 \times dG + k8 \times dB$ $Cr = k9 \times dY + k10 \times dR + k11 \times dG + k12 \times dB$.

5. An image pickup apparatus according to claim 1, wherein the factor determiner calculates the evaluation value in each pixel and determines the first and second weighting factors in each pixel.

6. An image pickup apparatus according to claim 1, further comprising a gain setter for setting a gain of the color information signal based on at least either one of brightness and darkness of a subject.

* * * * *